United States Patent Office 3,360,526
Patented Dec. 26, 1967

3,360,526
HETEROCYCLICAMINO METHYLENE ETHERS
OF BENZYLPHENOLS
William F. Minor, Fayetteville, N.Y., assignor to Bristol-Myers Company, New York, N.Y., a corporation of Delaware
No Drawing. Filed Dec. 29, 1964, Ser. No. 422,017
9 Claims. (Cl. 260—294.7)

ABSTRACT OF THE DISCLOSURE

Heterocyclicamino methylene ethers of benzylphenols are prepared by the reaction of a metal salt of the heteroamino methylene with benzylphenol. These ethers are antihistamines having a cough and nausea suppressant effect.

This application is a continuation-in-part of my prior, copending application Ser. No. 337,751, filed Jan. 15, 1964 and now abandoned.

This invention relates to novel antihistaminic and antifungal compounds. More particularly, this invention relates to certain basic ethers of substituted benzylphenols.

It is generally recognized that the liberation of histamine into the tissues of man, which can be brought about by a number of means, is responsible for many allergic manifestations. It is also well-known that certain drugs, called antihistamines, are effective in blocking the action of histamine and hence, in alleviating the symptoms of many allergic reactions. Unfortunately, however, antihistaminic drugs frequently elicit side reactions, such as nausea, which, although rarely serious, are undesirable. Moreover, most antihistamines do not have any antitussive effect, i.e., they do not act to relieve or prevent coughs which frequently accompany allergic manifestations.

It is an object of this invention to provide a new class of compounds which are valuable anti-allergic agents and which do not possess many of the disadvantages commonly associated with antihistamines. It is a further object of this invention to provide such novel compounds which also possess antinausea and antitussive activity. Finally, it is an object of this invention to provide novel compounds which exhibit antifungal activity upon topical application to plants and upon topical, parenteral and oral administration to animals.

These objectives have been achieved by the provision, according to the present invention, of bases of the formula

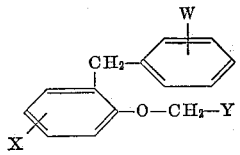

wherein X and W are each hydrogen, halogen, (lower)alkoxy, (lower)alkyl or trifluoromethyl and Y designates one of the radicals of the formula

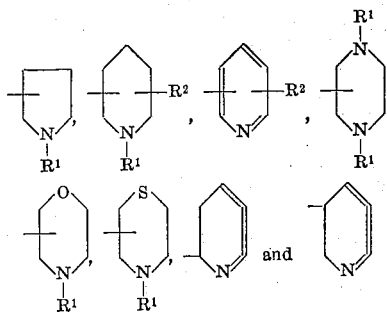

in which $R^1$ represents hydrogen, (lower)alkyl or phenyl-(lower)alkyl and $R^2$ represents hydrogen or methyl; and nontoxic acid addition and quaternary salts of said bases. Examples of nontoxic salts of the basic ethers of benzylphenols of this invention include their acid addition salts with inorganic or organic acids, such as hydrochloric acid, hydrobromic acid, hydriodic acid, sulfuric acid, phosphoric acid, maleic acid, acetic acid, citric acid, oxalic acid, succinic acid, benzoic acid, tartaric acid, phthalic acid, picric acid, fumaric acid, etc.; and their quaternary salts.

The preferred embodiments of the present invention are the salts and free bases of the compounds of the formula

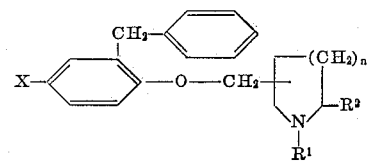

wherein X is hydrogen or chloro, $n$ is one or two, $R^1$ is (lower)alkyl and $R^2$ is hydrogen or methyl. It is particularly preferred that the bond to the ethereal methylene group be located at the 3-position of the pyrrolidine ring and at the 3- or 4-position of the piperidine ring.

The compounds of this invention are potent antihistaminic, antinausea and antitussive agents. Thus, they are effective in blocking the action of histamine and hence, in alleviating the symptoms of many allergic reactions. Moreover, they are useful in the control of nausea resulting from a wide variety of causes. Furthermore, these compounds are effective in controlling coughing due to various causes. The compounds of this invention may be administered to humans as the free base or as a nontoxic salt thereof. They may be given orally, parenterally or rectally.

When used to combat fungal diseases in plants the compounds of the present invention are applied topically, e.g., by spraying an aqueous solution containing a concentration by weight of 0.01 to 1.0 percent of a water-soluble salt of the compound such as the hydrochloride. Such diseases include *Monilinia fructicola*, *Alternaria solani* and bean rust.

The compounds of the present invention may be prepared, for example, by reacting a metal salt of a benzylphenol having the general formula

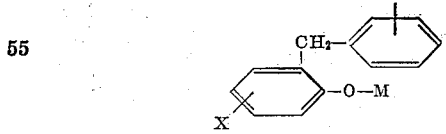

(in which X and W are as defined above and M represents a metal and preferably an alkali metal) with a compound having the general formula Z–$CH_2$–Y in which Y is as defined above and Z is a halo group, such as chloro, bromo or iodo or a tosylate group (e.g., the ester made from p-toluenesulfonyl chloride and the alcohol of the formula Z–$CH_2$–Y in which Z is hydroxyl). If one or both of the groups X in the product are halogens and it is desired to prepare the corresponding non-halogenated compound, the halogen groups may be removed by hydrogenation, e.g., over palladium.

Quaternary salts of the compounds of this invention may be prepared, for example, by reacting a basic ether of a benzylphenol having the general formula

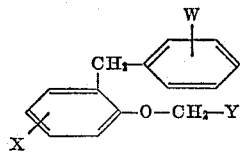

wherein W, X and Y are as defined above, with an alkyl halide, aralkyl halide, alkyl sulfate, etc.

The reactants which are used in the preparation of the novel compounds of this invention are either commercially available materials or may be prepared by methods known in the art. Thus, the 2-, 3- and 4-chloromethylpyridine hydrochlorides may be obtained commercially; the 3-chloromethyl-1-substituted pyrrolidines may be obtained by the method described by Wu and Feldkamp, J. Org. Chem., 26, 1519 (1961); and the 2-chloromethyl-1-substituted pyrrolidines and piperidines, 3-bromomethylthiomorpholine hydrobromide and 2-bromomethylpiperazine hydrobromide are available by the methods outlined by Piper and Johnston, J. Org. Chem., 28, 981–985 (1963). The necessary 2- and 3-halomethylquinuclidines are known; cf. Arch. Pharm. 281, 78 (1943); Ann. 545, 259 (1940); Helv. Chim. Acta 37, 1689 (1954). Substituted benzylphenols may be prepared as described in U.S. Patent No. 2,703,324.

The following examples illustrate the best modes contemplated for carrying out this invention.

EXAMPLE 1

3-(2-benzyl-4-chlorophenoxymethyle)-1-methylpyrrolidine

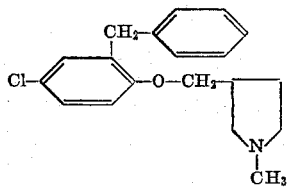

A mixture of 2-benzyl-4-chlorophenol (14.6 g.; 0.105 mole) and flake sodium hydroxide (4.8 g.; 0.095 mole) in 150 ml. of toluene is refluxed for 17 hours and stirred until the theoretical amount of water has been removed through a Dean-Stark trap (1.7 ml.). Refluxing of the mixture is then continued and 3-chloromethyl-1-methylpyrrolidine (14.6 g.; 0.105 mole) in 14 ml. of toluene is added dropwise over a period of 3.5 hours. The reaction mixture is refluxed for an additional 60 hours and is then cooled. The reaction mixture is washed twice wth 100 ml. portions of water and extracted with three 40 ml. portions of 6 N HCl. The combined acid extracts are washed once with ether, and the pH is adjusted to from 10 to 11 by the addition of 50% sodium hydroxide. It is then extracted three times with 70 ml. portions of ether, the combined ether extracts are dried for one hour over anhydrous $MgSO_4$ and distilled to give a product (15.0 g.; 46% of theoretical yield) which is an oil having a boiling point of 185–188° C. at a pressure of 0.7 mm. of mercury. The oil is then crystallized from Skellysolve B to obtain a product having a melting point of 55.5–59° C.

Analysis.—Calc'd for $C_{19}H_{22}ClNO$: C, 72.3; H, 7.02; N, 4.44. Found: C, 72.9; H, 7.15; N, 4.20.

This product is found upon oral administration to be an effective antihistaminic agent.

EXAMPLE 2

3-(2-benzylphenoxymethyl)-1-methylpyrrolidine

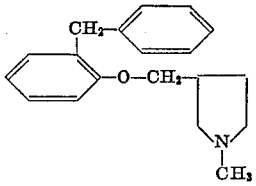

A solution of 3-(2-benzyl-4-chlorophenoxymethyl)-1-methylpyrrolidine (5.0 g.; 0.016 mole) in 100 ml. of absolute ethyl alcohol is hydrogenated at 50 p.s.i. over 2 g. of 30% palladium on diatomaceous earth. The theoretical amount of hydrogen required to effect the hydrogenation is absorbed in 20 minutes. The catalyst is then removed by filtration, the filtrate is concentrated to dryness in vacuo and the residue is dissolved in water. The solution is then made basic by the addition of 50% sodium hydroxide and is extracted three times with methylene chloride. The combined methylene chloride extracts are washed with water and are filtered through anhydrous $MgSO_4$. The filtrate is concentrated in vacuo leaving a residual yellow oil which crystallizes on standing. The crystalline product is recrystallized from n-pentane at −50° C. and rapidly collected by suction. The product, (1.8 g.; 41% of theoretical yield), has a melting point of from 44 to 47° C.

Analysis.—Calc'd for $C_{19}H_{23}NO$: C, 81.1; H, 8.24; N, 4.98. Found: C, 81.1; H, 8.14; N, 4.88.

This product, upon oral administration is an effective antihistaminic and antitussive agent.

EXAMPLE 3

2-(2-benzyl-4-chlorophenoxymethyl)pyrridine

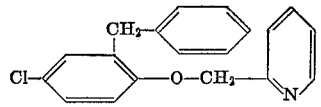

A mixture is prepared of 2-chloromethylpyridine hydrochloride (60.9 g.; 0.37 mole), 2-benzyl-4-chlorophenol (74.3 g.; 0.34 mole) and flake sodium hydroxide (32.4 g.; 0.81 mole) in 500 ml. of toluene. An immediate exothermic reaction occurs. After an hour, the exothermic reaction has subsided and the mixture is refluxed for 18 hours with stirring. The reaction mixture is then cooled, washed twice with 350 ml. portions of water and extracted with three 140. ml. portions of 6 N HCl. The hydrochloric acid extracts are combined and a product begins to precipitate immediately as the hydrochloride salt of 2-(2-benzyl-4-chlorophenoxymethyl)pyridine. This is collected and recrystallized from acetonitrile to obtain a product, (97.0 g.; 82% of theoretical yield), having a melting point of 154–156° C.

Analysis.—Calc'd for $C_{19}H_{17}Cl_2NO \cdot \frac{1}{2} H_2O$: C, 64.3; H, 4.84; N, 3.95. Found: C, 64.4; H, 5.07; N, 3.76.

A portion of the above product is converted to the free base by the addition of 50% NaOH. The resultant solution is extracted with three 120 ml. portions of ether and the combined ether extracts are dried over $MgSO_4$ for one hour. The ether is stripped off in vacuo and the resultant oil is allowed to stand until a crystalline product is formed. The product, 2-(2-benzyl-4-chlorophenoxymethyl)pyridine, is recrystallized from Skellysolve B to obtain a product having a melting point of 55.5–56.5° C.

Analysis.—Calc'd for $C_{19}H_{16}ClNO$: C, 73.7; H, 5.21; N, 4.52. Found: C, 73.6; H, 5.06; N, 4.68.

EXAMPLE 4

*2-(2-benzyl-4-chlorophenoxymethyl)piperidine*

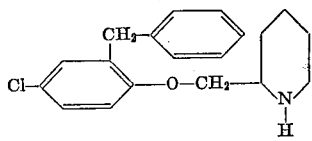

A solution of 2-(2-benzyl-4-chlorophenoxymethyl)pyridine (6.2 g.; 0.02 mole) in 100 ml. of glacial acetic acid is hydrogenated at 50 p.s.i. over 0.5 g. of platinum dioxide. The theoretical up take of hydrogen is recorded in 35 minutes. The catalyst is removed by filtration and the filtrate is made basic by the addition of 20% sodium hydroxide. The solution is then extracted three times with ether and the combined ether extracts are dried over $Na_2SO_4$. Upon evaporation of the ether in vacuo a yellow oil is obtained. This oil is dissolved in hot Skellysolve B. Upon cooling of this solution, a white solid which has a melting point of 65–66° C. forms and is collected by filtration. The product, (1.7 g.; 27% of theoretical yield) is then recrystallized from acetonitrile.

*Analysis.*—Calc'd for $C_{19}H_{22}ClNO$: C, 72.4; H, 7.03; N, 4.43; Cl, 11.22. Found: C, 72.3; H, 7.07; N, 4.45; Cl, 11.34.

EXAMPLE 5

*2-(2-benzyl-4-chlorophenoxymethyl)-1-methylpyridinium iodide*

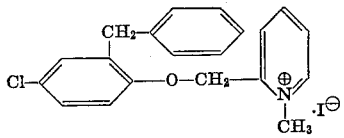

To a solution of 2-(2-benzyl-4-chlorophenoxymethyl)pyridine (29.0 g.; 0.093 mole) in 150 ml. of acetonitrile there is added methyl iodide (15.6 g.; 0.11 mole) and the mixture is refluxed for one hour. A crystalline white product is obtained which is recrystallized from acetonitrile. The resultant product (25.0 g.; 59% of the theoretical yield) has a melting point of 149–151° C.

*Analysis.*—Calc'd for $C_{20}H_{19}ClINO$: C, 53.3; H, 4.25; N, 3.11. Found: C, 53.3; H, 4.18; N, 3.11.

EXAMPLE 6

*2-(2-benzyl-4-chlorophenoxymethyl)-1-methylpiperidine*

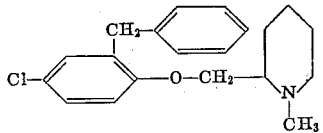

A suspension of 2-(2-benzyl-4-chlorophenoxymethyl)-1-methylpyridinium iodide (9.0 g.; 0.02 mole) and 0.5 g. of platinum dioxide in 300 ml. of water is hydrogenated at 50 p.s.i. and 50° C. The theoretical uptake of hydrogen is recorded in two hours. The mixture is then heated to boiling to dissolve all of the solid products, filtered, made basic by the addition of 50% sodium hydroxide, cooled and extracted three times with ether. The combined ether extracts are dried over anhydrous $K_2CO_3$, filtered and the ether is removed in vacuo. The resultant pink solid is recrystallized twice from acetonitrile to yield a product (1.8 g.; 27% of theoretical yield) having a melting point of 95–96° C.

*Analysis.*—Calc'd for $C_{20}H_{24}ClNO$: C, 72.8; H, 7.34; N, 4.24; Cl, 10.72. Found: C, 72.7; H, 7.33; N, 4.15; Cl, 11.06.

EXAMPLE 7

*4-(2-benzyl-4-chlorophenoxymethyl)pyridine*

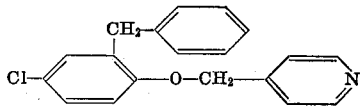

A mixture is prepared of 4-chloromethylpyridine hydrochloride (50.0 g.; 0.34 mole), 2-benzyl-4-chlorophenol (74.5 g.; 0.34 mole) and sodium hydroxide (27.2 g.; 0.68 mole) in 250 ml. of toluene. The solution is refluxed for 20 hours and cooled. There are then added 300 ml. of water and the mixture is stirred for 15 minutes. The organic phase is separated, washed again with water and extracted with three 200 ml. portions of 6 N HCl. A crystalline solid is formed in the ether extract which is recovered by filtration and purified by recrystallization from methanol. The product, the hydrochloride salt of 4-(2-benzyl - 4 - chlorophenoxymethyl)pyridine (33.0 g.; 28% of theoretical yield), is found to have a melting point of 206–210° C.

*Analysis.*—Calc'd for $C_{19}H_{17}Cl_2NO$: C, 66.0; H, 4.95. Found: C, 65.8; H, 4.41.

EXAMPLE 8

*4-(2-benzyl-4-chlorophenoxymethyl)-1-methylpyridinium iodide*

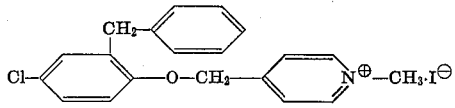

A mixture is prepared comprising 4-(2-benzyl-4-chlorophenoxymethyl)pyridine which is obtained by dissolving a portion of the product of Example 7 in water, adding NaOH to make the solution basic, extracting with ether and stripping off the solvent (33.0 g.; 0.107 mole) and methyl iodide (15.6 g.; 0.11 mole) in 100 ml. of acetonitrile. This mixture is refluxed for one hour and cooled. The precipitated solids are collected by filtration and recrystallized from methanol. The product (10.5 g.; 21.8% of theoretical yield) is found to have a melting point of 141–143° C. with decomposition.

*Analysis.*—Calc'd for $C_{20}H_{19}ClINO$: C, 53.3; H, 4.25; N, 3.11. Found: C, 53.3; H, 4.45; N, 2.89.

EXAMPLE 9

When the 3-chloromethyl-1-methylpyrrolidine of Example 1 is replaced with 0.105 mole of, respectively, 2-chloromethyl - 1 - ethylpyrrolidine, 4 - chloromethyl - 1 - benzylpiperidine, 3 - bromomethylthiomorpholine, 2-bromomethylpiperazine, 3-bromomethylmorpholine, 2-chloromethylquinuclidine, 3- chloromethylquinuclidine and 2-chloromethylpyrrolidine, there is obtained, instead of 3 - (2-benzyl-4-chlorophenoxymethyl)-1-methylpyrrolidine, the corresponding 2 - (2-benzyl - 4 - chlorophenoxymethyl)-1-ethylpyrrolidine, 4-(2-benzyl-4-chlorophenoxymethyl)-1-benzylpiperidine, 3-(2-benzyl-4-chlorophenoxymethyl)thiomorpholine, 2-(2-benzyl - 4 - chlorophenoxymethyl)piperazine, 2-(2-benzyl - 4 - chlorophenoxymethyl)piperazine, 3-(2-benzyl-4-chlorophenoxymethyl)morpholine, 2(2-benzyl - 4 - chlorophenoxymethyl)quinuclidine, 3-(2-benzyl-4-chlorophenoxymethyl)quinuclidine and 2-(2-benzyl-4-chlorophenoxymethyl)pyrrolidine, respectively.

EXAMPLE 10

In the process of Example 1, when the 2-benzyl-4-chlorophenol is replaecd with 0.1 mole of 2-benzyl-4-ethoxyphenol, 2-benzyl-4-methoxyphenol, 2-benzyl-4-t-butylphenol, 2-(4'-isopropylbenzyl)phenol, 2(4'-methoxybenzyl)phenol and 2-(4'-fluorobenzyl)phenol, respectively, there are obtained, instead of 3-(2-benzyl - 4 - chlorophenoxymethyl)-1-methylpiperidine as the final product, the corresponding 3-(2-benzyl-4-ethoxyphenoxymethyl)-1-methylpyrrolidine, 3-(2-benzyl - 4 - methoxyphenoxymethyl)-1-methylpyrrolidine, 3-(2-benzyl - 4 - t-butylphenoxymethyl) - 1 - methylpyrrolidine, 3 - [2-(4'-isopropylbenzyl)phenoxymethyl] - 1 - methylpyrrolidine, 3-[2-(4'-methoxybenzyl)phenoxymethyl] - 1 - methylpyrrolidine, and 3 - [2-(4'-fluorobenzyl)phenoxymethyl]-1-methylpyrrolidine.

EXAMPLE 11

*2-(2-benzylphenoxymethyl)piperidine hydrochloride*

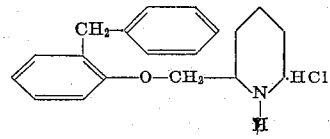

By hydrogenation at room temperature and 50 p.s.i. of 9.0 g. (0.0285 mole) of 2-(2-benzyl-4-chlorophenoxymethyl)piperidine, 4 g. of 30% palladium on diatomaceous earth and 200 ml. of absolute ethanol, there was obtained 8.0 g. (90%) of 2-(2-benzylphenoxymethyl)-piperidine hydrochloride by evaporation of the reaction solvent after removal of the catalyst. Recrystallization from methanol-ether yielded 5.5 g. of product having M.P. 207–208° C.

*Analysis.*—Calc'd for $C_{19}H_{24}ClNO$: C, 72.0; H, 7.60; N, 4.42. Found: C, 71.8; H, 7.58; N, 4.27.

EXAMPLE 12

*3-(2-benzyl-4-chlorophenoxymethyl)-1-methylpiperidine*

(Free base and hydrochloride)

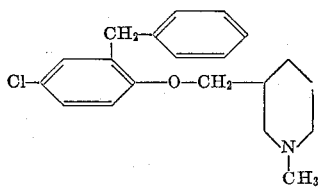

A mixture of 36.8 g. (0.20 mole) of 3-chloromethyl-1-methylpiperidine hydrochloride, 43.6 g. (0.20 mole) of 2-benzyl-4-chlorophenol and 16.0 g. (0.40 mole) of flake sodium hydroxide in 250 ml. of toluene was refluxed for 18 hours. The mixture was washed with water and extracted several times with 6 N hydrochloric acid. The acid extracts were made basic and extracted with ether to yield only a small amount of yellow oil. Therefore the toluene reaction mixture was evaporated under reduced pressure and the residual gum was made strongly basic with 50% sodium hydroxide and extracted several times with ether. Drying and distillation gave 23.4 g. (35.4%) of 3-(2-benzyl - 4 - chlorophenoxymethyl)-1-methylpiperidine as a light-yellow, viscous oil of B.P. 185–186° C./0.5 mm.

*Analysis.*—Calc'd for $C_{20}H_{24}ClNO$: C, 72.8; H, 7.34; N, 4.24. Found: C, 72.8; H, 7.20; N, 4.23.

To a 7.2 g. portion of the above free base in 250 ml. diethyl ether there was added gaseous hydrogen chloride. The salt which precipitated in crystalline form was collected, washed with dry ether, found to weigh 10.2 g. (M.P. 192–193° C.) and was recrystallized from a minimum of 100% ethanol-ether to give 3-(2-benzyl-4-chlorophenoxymethyl)-1-methylpiperidine hydrochloride melting at 192.5–193.5° C.

*Analysis.*—Calc'd for $C_{20}H_{24}NOCl \cdot HCl$: C, 65.51; H, 6.85; N, 3.82. Found: C, 65.55; H, 7.19; N, 3.51.

This salt in spore germination tests showed activity against *Monilinia fructicola* and *Alternaria solani* and when tested on living plants gave good control of bean rust.

This salt when tested *in vitro* prevented the growth of the following organisms at the concentrations given in parenthesis: *Microsporum canis* (8 mcg./ml.), *Epidermophyton floccosum* (10 mcg./ml.) and *Microsporum audouini* (10 mcg./ml.). Infections in guinea pigs of *T. rubrum*, *M. gypseum* and *E. floccosum* were cured by the administration of this salt for about three weeks at daily oral dosages of 25–125 mgm./kg.

EXAMPLE 13

*3-(2-benzylphenoxymethyl)-1-methylpiperidine hydrochloride*

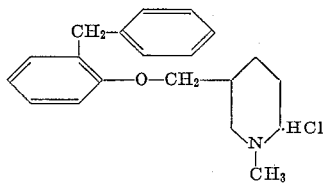

By hydrogenation at room temperature and 50 p.s.i. of 10.0 g. (0.03 mole) of 3-(2-benzyl-4-chlorophenoxymethyl)-1-methylpiperidine, 4.0 g. of 30% palladium on diatomaceous earth and 300 ml. of absolute ethanol, there was obtained, after four recrystallizations from ethanol, 1.7 g. (19%) of 3-(2-benzylphenoxymethyl)-1-methylpiperidine hydrochloride; M.P. 175–176° C.

*Analysis.*—Calc'd for $C_{20}H_{26}ClNO$: C, 72.5; H, 7.90. Found: C, 71.8; H, 7.78.

A sample of 3-(2-benzylphenoxymethyl)-1-methylpiperidine free base was quaternized with methyl iodide in acetonitrile to give 3-(2-benzylphenoxymethyl)-1,1-dimethylpiperidinium iodide; M.P. 193–195° C.

*Analysis.*—Calc'd for $C_{21}H_{27}INO$: C, 57.8; H, 6.45. Found: C, 58.2; H, 6.65.

EXAMPLE 14

*3-(2-benzyl-4-chlorophenoxymethyl)-1-ethylpyrrolidine*

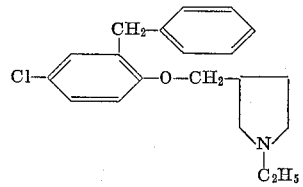

By the manner described in Example 1, using 15.5 g. (0.105 mole) of 3-chloromethyl-1-ethylpyrrolidine, 20.7 g. (0.105 mole) of 2-benzyl-4-chlorophenol, 4.7 g. (0.117 mole of flake sodium hydroxide and 175 ml. of toluene, there was obtained 23.2 g. (74%) of 3-(2-benzyl-4-chlorophenoxymethyl) - 1 - ethylpyrrolidine; M.P. 70–72° C.

*Analysis.*—Calc'd for $C_{20}H_{24}ClNO$: C, 72.9; H, 7.33; N, 4.25. Found: C, 73.15; H, 7.41; N, 4.22.

EXAMPLE 15

*3-(2-benzyl-4-chlorophenoxymethyl)-1-isopropylpyrrolidine*

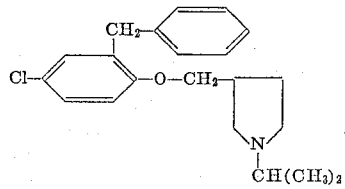

By the manner described in Example 1, using 29.0 g. (0.18 mole) of 3-chloromethyl-1-isopropylpyrrolidine, 35.6 g. (0.163 mole) of 2-benzyl-4-chlorophenol, 8.0 g. (0.20 mole) of flake sodium hydroxide and 280 ml. of toluene, there was obtained 46.0 g. (82.2%) of 3-(2-benzyl - 4-chlorophenoxymethyl)-1-isopropylpyrrolidine; B.P. 213–215° C./0.8 mm.

*Analysis.*—Calc'd for $C_{21}H_{26}ClNO$: C, 73.50; H, 7.65; N, 4.08. Found: C, 73.25; H, 7.66; N, 4.15.

EXAMPLE 16

*2-(2-benzylphenoxymethyl)-1-methylpiperidine*

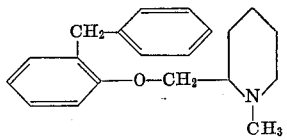

By the manner described in Example 2, using 2-(2-benzyl-4-chlorophenoxymethyl)-1-methylpiperidine (3.3 g.; 0.01 mole), 2 g. of 30% palladium on diatomaceous earth and 50 ml. of ethyl alcohol, the product, 2-(2-benzylphenoxymethyl)-1-methylpiperidine, was obtained as the hydrochloride. After two recrystallizations from methyl alcohol the remaining 1.0 g. of hydrochloride had M.P. 158–159° C.

*Analysis.*—Calc'd for $C_{20}H_{26}ClNO$: C, 72.6; H, 7.92; N, 4.23. Found: C, 72.3; H, 7.99; N, 4.59.

EXAMPLE 17

*2-(2-benzyl-4-chlorophenoxymethyl)-6-methylpyridine hydrochloride*

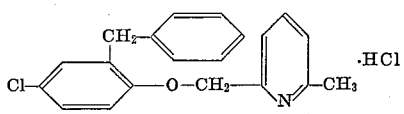

By the procedure described in Example 3, using 6-methyl-2-picolylchloride hydrochloride (50.0 g.; 0.28 mole), 2-benzyl-4-chlorophenol (61.7 g.; 0.28 mole) and flake sodium hydroxide (22.5 g.; 0.56 mole) in 300 ml. of toluene, there was obtained 70.8 g. (98%) of crystalline 2-(2-benzyl-4-chlorophenoxymethyl)-6-methylpyridine hydrochloride. After two recrystallizations, from methyl alcohol-ether and acetonitrile, the material had an M.P. of 179–181° C.

*Analysis.*—Calc'd for $C_{20}H_{19}Cl_2NO$: C, 66.7; H, 5.35; N, 3.88. Found: C, 67.0; H, 5.38; N, 3.80.

EXAMPLE 18

*2-(2-benzyl-4-chlorophenoxymethyl)-1,6-dimethylpyridinium p-toluenesulfonate*

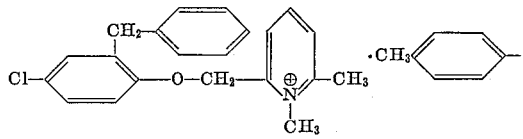

A suspension of 2-(2-benzyl-4-chlorophenoxymethyl)-6-methylpyridine hydrochloride (10.0 g.; 0.031 mole) in water was made strongly basic with 10% sodium hydroxide and extracted several times with ether. The crude free base recovered from the washed and dried extracts was dissolved in 50 ml. of acetone, methyl p-toluenesulfonate (7.5 g.; 0.04 mole) was added and the mixture was refluxed for three hours. Removal of the solvent and two recrystallizations from acetonitrile gave 3.1 g. (20%) of 2-(2-benzyl-4-chlorophenoxymethyl)-1,6-dimethylpyridinium p-toluenesulfonate; M.P. 194–195° C.

*Analysis.*—Calc'd for $C_{28}H_{28}ClNO_4S$: C, 66.3; H, 5.56; N, 2.76. Found: C, 66.0; H, 5.53; N, 2.34.

EXAMPLE 19

*2-(2-benzyl-4-chlorophenoxymethyl)-1,6-dimethylpiperidine*

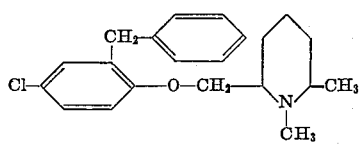

An acetone solution of 2-(2-benzyl-4-chlorophenoxymethyl)-6-methylpyridine, prepared from 30.0 g. of the hydrochloride as outlined in Example 18, was treated with methyl iodide (13 ml., 0.21 mole) and refluxed for two hours. Cooling produced a precipitate of 2-(2-benzyl-4-chlorophenoxymethyl)-1,6-dimethyl pyridinium iodide which was recrystallized from methyl alcohol-water; M.P. 158–159° C.

The 2-(2-benzyl-4-chlorophenoxymethyl)-1,6-dimethylpyridinium iodide (5.0 g.; 0.0107 mole) was hydrogenated in the manner described in Example 6. The oil which was obtained was purified by evaporative distillation at 180° C./0.05 mm. to yield 3.0 g. (82%) of amber 2-(2-benzyl-4-chlorophenoxymethyl)-1,6-dimethylpiperidine.

*Analysis.*—Calc'd for $C_{21}H_{26}ClNO$: C, 73.6; H, 7.64; N, 4.7. Found: C, 73.2; H, 7.14; N, 4.96.

A solution of 2-(2-benzyl-4-chlorophenoxymethyl)-1,6-dimethylpiperidine in acetone was treated with methyl iodide to give 2-(2-benzyl-4-chlorophenoxymethyl)-1,1,6-trimethyl-piperidinium iodide; M.P. 184–185° C.

*Analysis.*—Calc'd for $C_{22}H_{29}ClINO$: C, 54.5; H, 6.02. Found: C, 54.2; H, 6.00.

EXAMPLE 20

*3-(2-benzyl-4-chlorophenoxymethyl)-4-methylthiamorpholine*

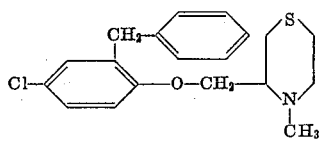

By the manner described in Example 1, using 3-chloromethyl-4-methylthiamorpholine (15.0 g.; 0.097 mole), 2-benzyl-4-chlorophenol (19.2 g.; 0.088 mole) and flake sodium hydroxide (4.3 g.; 0.108 mole) in 155 ml. of toluene, there was obtained 9.7 g. (31.7%) of 3-(2-benzyl-4-chlorophenoxymethyl)-4-methylthiamorpholine as a viscous oil of B.P. 200–205° C./0.55 mm.

*Analysis.*—Calc'd for $C_{19}H_{22}ClNOS$: C, 65.6; H, 6.38; N, 4.03. Found: C, 65.9; H, 6.51; N, 3.79.

While in the foregoing specification various embodiments of this invention have been set forth in specific detail and elaborated for the purpose of illustartion, it will be apparent to those skilled in the art that this invention is susceptible to other embodiments and that many of the details can be varied widely without departing from the basic concept and the spirit and scope of the invention.

I claim:

1. A member selected from the group consisting of compounds of the formula

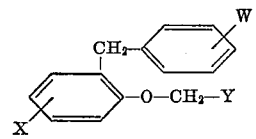

wherein X and W are each a member selected from the group consisting of hydrogen, halogen, (lower)alkoxy, (lower)alkyl and trifluoromethyl and Y is a member selected from the group consisting of radicals of the formula

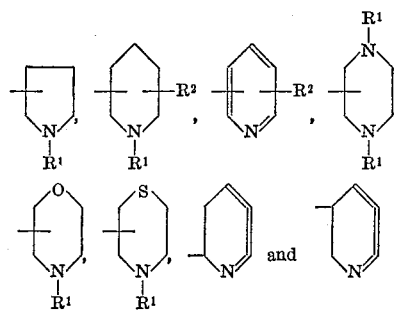

in which $R^1$ represents a member selected from the group consisting of hydrogen, (lower)alkyl and phenyl (lower)

alkyl and $R^2$ represents a member selected from the group consisting of hydrogen and methyl; and nontoxic acid addition and quaternary salts thereof.

2. A compound of the formula

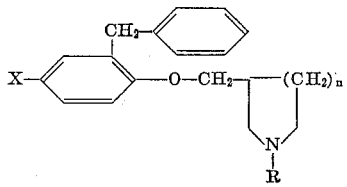

wherein $n$ is an integer from one to two inclusive, R represents (lower)alkyl and X is a hydrogen or chlorine atom.

3. A compound of the formula

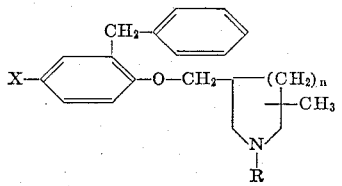

wherein $n$ is an integer from one to two inclusive, R represents (lower)alkyl and X is a hydrogen or chlorine atom.

4. 3 - (2 - benzyl - 4 - chlorophenoxymethyl) - 1 - methylpiperidine.

5. 3 - (2 - benzyl - 4 - chlorophenoxymethyl) - 1 - methylpiperidine hydrochloride.

6. 3 - (2 - benzyl - 4 - chlorophenoxymethyl) - 1 - methylpyrrolidine.

7. 4 - (2 - benzyl - 4 - chlorophenoxymethyl) - 1 - methylpiperidine.

8. 4 - (2 - benzyl - 4 - chlorophenoxymethyl) - 1,6 - dimethylpiperidine.

9. 3 - (2 - benzyl - 4 - chlorophenoxymethyl) - 1,6 - dimethylpiperidine.

References Cited
UNITED STATES PATENTS

| | | | |
|---|---|---|---|
| 2,703,324 | 3/1955 | Binkley et al. | 260—294.7 |
| 2,768,207 | 10/1956 | Cheney et al. | 260—294.7 |
| 2,966,518 | 12/1960 | Johnson | 260—294.7 |
| 3,117,059 | 1/1964 | Rubinstein et al. | 260—294.7 |

OTHER REFERENCES

Burger: Medicinal Chem., 2nd ed., Interscience, New York, 1960, RS. 403 B8 1960 (pp. 524–533).

WALTER A. MODANCE, *Primary Examiner.*

NORMA S. MILESTONE, *Examiner.*

A. D. SPEVACK, *Assistant Examiner.*